United States Patent
Halaby Senerman et al.

(10) Patent No.: US 10,948,902 B2
(45) Date of Patent: Mar. 16, 2021

(54) METHOD AND SYSTEM FOR WORKLOAD BALANCING OF A PRODUCTION LINE

(71) Applicant: SIEMENS INDUSTRY SOFTWARE LTD., Airport City (IL)

(72) Inventors: Varda Halaby Senerman, Tel Aviv (IL); Noga Bar On, Tel Aviv (IL); Hadar Hillel, Petah Tikva (IL)

(73) Assignee: Siemens Industry Software Ltd., Airport City (IL)

( * ) Notice: Subject to any disclaimer, the term of this patent is extended or adjusted under 35 U.S.C. 154(b) by 182 days.

(21) Appl. No.: 16/353,634

(22) Filed: Mar. 14, 2019

(65) Prior Publication Data
US 2019/0286113 A1 Sep. 19, 2019

Related U.S. Application Data

(60) Provisional application No. 62/643,380, filed on Mar. 15, 2018.

(30) Foreign Application Priority Data
Mar. 11, 2019 (EP) .................................... 19162021

(51) Int. Cl.
*G05B 19/418* (2006.01)
*G06Q 10/06* (2012.01)

(52) U.S. Cl.
CPC ... *G05B 19/41865* (2013.01); *G05B 19/4188* (2013.01); *G05B 19/41885* (2013.01); *G06Q 10/06* (2013.01); *G06Q 10/063* (2013.01); *G06Q 10/06316* (2013.01)

(58) Field of Classification Search
CPC .......... G05B 19/41865; G05B 19/4188; G05B 19/41885
See application file for complete search history.

(56) References Cited

U.S. PATENT DOCUMENTS

| | | | |
|---|---|---|---|
| 4,852,001 A | 7/1989 | Tsushima et al. | |
| 5,826,236 A | 10/1998 | Narimatsu et al. | |
| 6,198,980 B1 | 3/2001 | Costanza | |
| 6,790,686 B1 * | 9/2004 | Purdy | G05B 19/41865 438/14 |
| 7,197,369 B1 * | 3/2007 | Chien | G05B 19/41865 700/100 |

(Continued)

FOREIGN PATENT DOCUMENTS

| | | |
|---|---|---|
| CN | 102323952 A | 1/2012 |
| CN | 102521690 A | 6/2012 |

(Continued)

*Primary Examiner* — Ronald D Hartman, Jr.
(74) *Attorney, Agent, or Firm* — Laurence Greenberg; Werner Stemer; Ralph Locher

(57) ABSTRACT

Methods and a system include getting, for each variant, input on a probability of occurring and inputs on a variant assigned workload time for a given resource. For each resource of the line, each variant is represented with a graphic object having a first measurable parameter representing the variant probability and a second measurable parameter representing the variant assigned workload time. At least one resource requiring workload balancing on a specific variant is determined by taking into account a combination of the first measurable parameter and the second measurable parameter of the specific variant.

15 Claims, 11 Drawing Sheets

(56) References Cited

U.S. PATENT DOCUMENTS

| | | |
|---|---|---|
| 8,136,114 B1 | 3/2012 | Gailloux et al. |
| 2001/0027350 A1* | 10/2001 | Koga ................. G06Q 10/06 |
| | | 700/95 |
| 2003/0050826 A1* | 3/2003 | Cargille ............... G06Q 10/06 |
| | | 705/7.25 |
| 2004/0143352 A1* | 7/2004 | Gyorfi .................. G06Q 10/06 |
| | | 700/99 |
| 2004/0167652 A1* | 8/2004 | Ishii ............... G06Q 10/06316 |
| | | 700/100 |
| 2005/0256599 A1* | 11/2005 | Peng .................... G06Q 10/06 |
| | | 700/100 |
| 2008/0275584 A1 | 11/2008 | Izumi et al. |
| 2009/0018687 A1* | 1/2009 | Ishibashi ............... G06Q 10/06 |
| | | 700/103 |
| 2009/0177305 A1* | 7/2009 | Falkenauer ...... G05B 19/41865 |
| | | 700/97 |
| 2010/0023385 A1* | 1/2010 | Galvan .................. G06Q 10/06 |
| | | 705/7.42 |
| 2011/0022212 A1* | 1/2011 | Nonaka ............. G05B 19/4184 |
| | | 700/108 |
| 2017/0243135 A1 | 8/2017 | Ooba et al. |
| 2018/0024518 A1* | 1/2018 | Jin .................... G05B 19/41845 |
| | | 112/217.2 |
| 2018/0136793 A1* | 5/2018 | Kohlhoff ................. G09B 5/02 |

FOREIGN PATENT DOCUMENTS

| | | |
|---|---|---|
| EP | 1887498 A1 | 2/2008 |
| EP | 2610696 A1 | 7/2013 |
| GB | 2194086 A | 2/1988 |
| WO | 0028457 A1 | 5/2000 |

\* cited by examiner

FIG 8A

Operations — 801

| # | OBJECT STRING | REV NAME | VARIANT CONDITIONS | ITEM ID |
|---|---|---|---|---|
| 1 | 001010/A; 1-SECURE... | SECURE BREMBO CALIPER | CHASIS=SUPER SPORT OR | 001010 |
| 2 | 001014/A; 1-OBTAI... | OBTAIN AND INSTALL RO... | CHASIS=STANDARD | 001014 |
| 3 | 001019/A; 1-OBTAI... | OBTAIN AND INSTALL RO... | CHASIS=SUPER SPORT OR | 001019 |
| 4 | 001020/A; 1-OBTAI... | OBTAIN AND INSTALL RO... | CHASIS=STANDARD | 001020 |
| 5 | 001017/A; 1-SECURE... | SECURE BREMBO CALIPER | CHASIS=STANDARD | 001021 |
| 6 | 001022/A; 1-Dumm... | Dummy Operation | CHASIS=STANDARD | 001017 |
| 7 | 001010/A; 1-Cucum... | Cucumber Test Operation | CHASIS=STANDARD | 001022 |

FIG 8B

Operations — 810

| # | OBJECT STRING | REV NAME | VARIANT CONDITIONS | ITEM ID |
|---|---|---|---|---|
| 1 | 001010/A; 1-SECURE... | SECURE BREMBO CALIPER | CHASIS=SUPER SPORT OR | 001010 |
| 2 | 001014/A; 1-OBTAI... | OBTAIN AND INSTALL RO... | CHASIS=STANDARD | 001014 |
| 3 | 001019/A; 1-OBTAI... | OBTAIN AND INSTALL RO... | CHASIS=SUPER SPORT OR | 001019 |
| 4 | 001020/A; 1-OBTAI... | OBTAIN AND INSTALL RO... | CHASIS=STANDARD | 001020 |
| 5 | 001017/A; 1-SECURE... | SECURE BREMBO CALIPER | CHASIS=STANDARD | 001021 |
| 6 | 001022/A; 1-Dumm... | Dummy Operation | CHASIS=STANDARD | 001017 |
| 7 | 001010/A; 1-Cucum... | Cucumber Test Operation | CHASIS=STANDARD | 001022 |

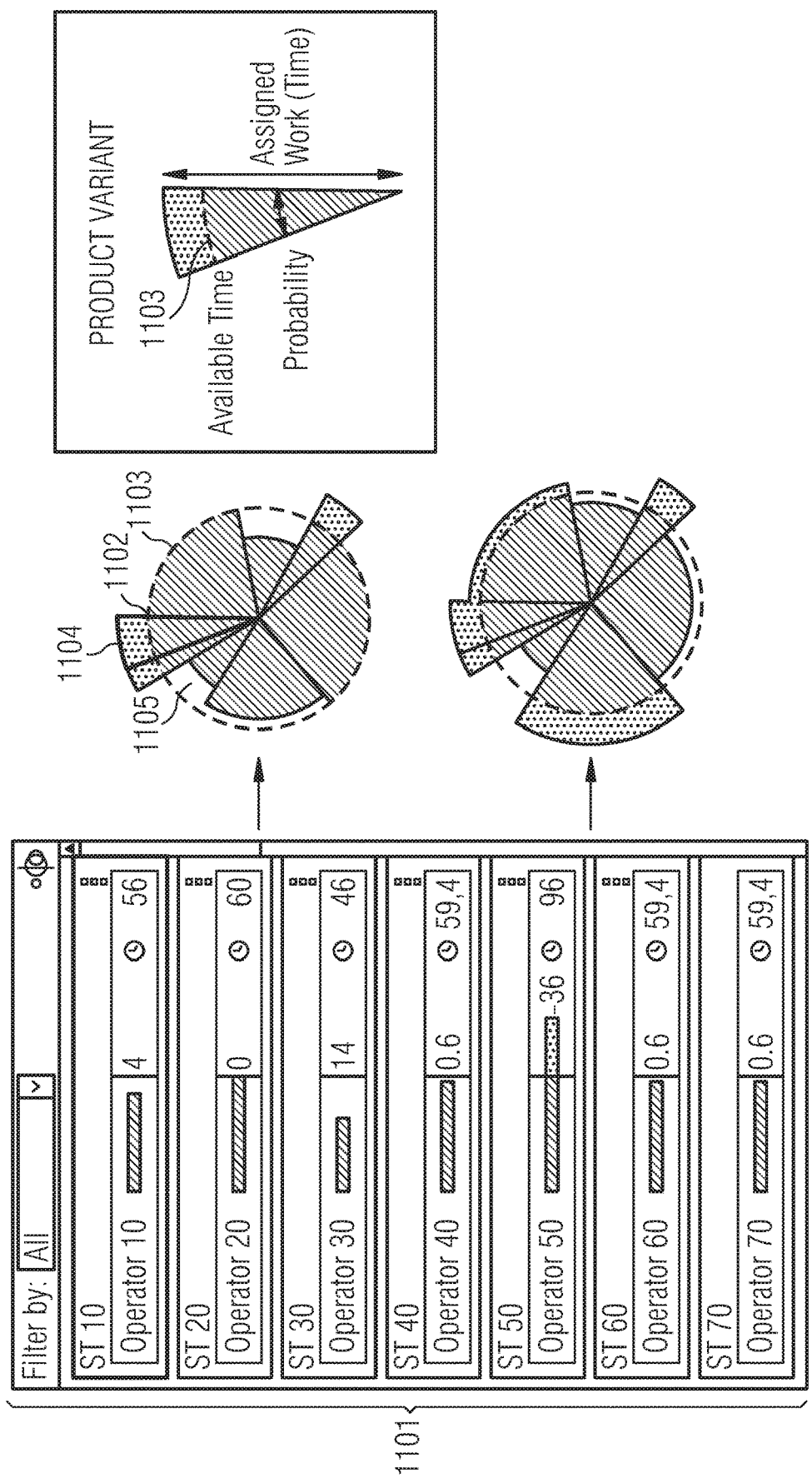

METHOD AND SYSTEM FOR WORKLOAD BALANCING OF A PRODUCTION LINE

CROSS-REFERENCE TO RELATED APPLICATION

This application claims the priority, under 35 U.S.C. § 119(e), of provisional application No. 62/643,380 filed Mar. 15, 2018; the prior application is herewith incorporated by reference in its entirety; this application also claims the benefit, under 35 U.S.C. § 119, of European patent application EP 19162021, filed Mar. 11, 2019; the prior application is herewith incorporated by reference in its entirety.

BACKGROUND OF THE INVENTION

Technical Field

The present disclosure is directed, in general, to computer-aided design (CAD), computer-aided manufacturing (CAM), computer-aided engineering (CAE), visualization, simulation, and manufacturing systems, product data management (PDM) systems, product lifecycle management (PLM) systems, and similar systems, that are used to create, use, and manage data for products and other items (collectively referred to herein as product systems).

In industrial manufacturing, there is a need of balancing the workload of serial production lines in order to limit under and/or over utilization of line resources so as to reduce costs and possible production bottlenecks.

With the term manufacturing "resource" it is herein intended a station, a machine, a workstation, an operator, any manufacturing resource performing manufacturing operations or any entity to which a production workload can be assigned and/or any combination thereof.

Line balancing becomes a particularly complex and difficult task in scenarios where a mix of product variants is to be produced in the same serial production line. Such lines are also known in the field with the term "multi-variant serial production lines" or "mixed model production lines".

With the term "variant" of a mixed production environment—including a mixture of products, or of product variants with different options—it is herein intended one of various different products or different variations of the same product.

Product line managers are faced with the challenge of balancing operations across resources of the line while taking into account the variabilities and the probabilities of the various different variants, the cycle times and durations of the various manufacturing operations.

With the term "variant workload" or "workload time" of a given resource and a given variant, it is herein indicated the total duration of the operations assigned to the given resource per a given variant.

The terms "takt-time" and "cycle-time" of a given resource are used herein interchangeably to indicate the available workload-time of the given resource.

Hence, product line managers of multi-variant serial production lines, in order to balance the line, have to take into consideration a variety of production parameters and constraints, including the duration of the manufacturing operations (workloads) of the various variants, the probability of the variant related operations, and the constraints of the takt-times of the line resources.

In order to take interactive decisions for line balancing, for resource allocations and/or for evaluating the instant impact when line parameters are changed, product line managers often make use of two-dimensional ("2D") graphic screens displaying visual information on these production parameters.

Unfortunately, given the complexity of the task, current interactive techniques for workload balancing of multi-variant serial production lines are not satisfactory and improvements are therefore desired.

SUMMARY OF THE DISCLOSURE

Variously disclosed embodiments include methods and corresponding systems and computer readable mediums that may be used to for workload balancing of a multi-variant serial production line. In one example, a method includes: receiving, for each variant, inputs on a probability of occurring for the variant and inputs on a variant assigned workload time for a given resource. The method includes, for each resource of the line, representing each variant with a graphic object having a first measurable parameter representing the variant probability and a second measurable parameter representing the available workload time of the resource. The method includes determining at least one resource requiring workload balancing on a specific variant by taking into account a combination of the first measurable parameter and the second measurable parameter of the specific variant.

In another example, a method for resource workload balancing may comprise acts carried out through operation of at least one processor that correspond to the functions for which the previously described at least one processor is configured to carry out.

A further example may include a non-transitory computer readable medium encoded with executable instructions (such as a software component on a storage device) that when executed, causes at least one processor to carry out this described method.

Another example may include a product or apparatus including at least one hardware, software, and/or firmware based processor, computer, component, controller, means, module, and/or unit configured for carrying out functionality corresponding to this described method.

The foregoing has outlined rather broadly the technical features of the present disclosure so that those skilled in the art may better understand the detailed description that follows.

Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the detailed description below, it should be understood that various definitions for certain words and phrases are provided throughout this document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

Other features which are considered as characteristic for the invention are set forth in the appended claims.

Although the invention is illustrated and described herein as embodied in a method and a system for workload balancing of a production line, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 8A and 8B are illustrations of an example of a second pop-up window for a selected variant of a given resource in accordance with disclosed embodiments;

FIG. 11 is an illustration of a fourth exemplary chart representation of multi-variant resources in a serial production line in accordance with disclosed embodiments.

DETAILED DESCRIPTION

Figure 1:
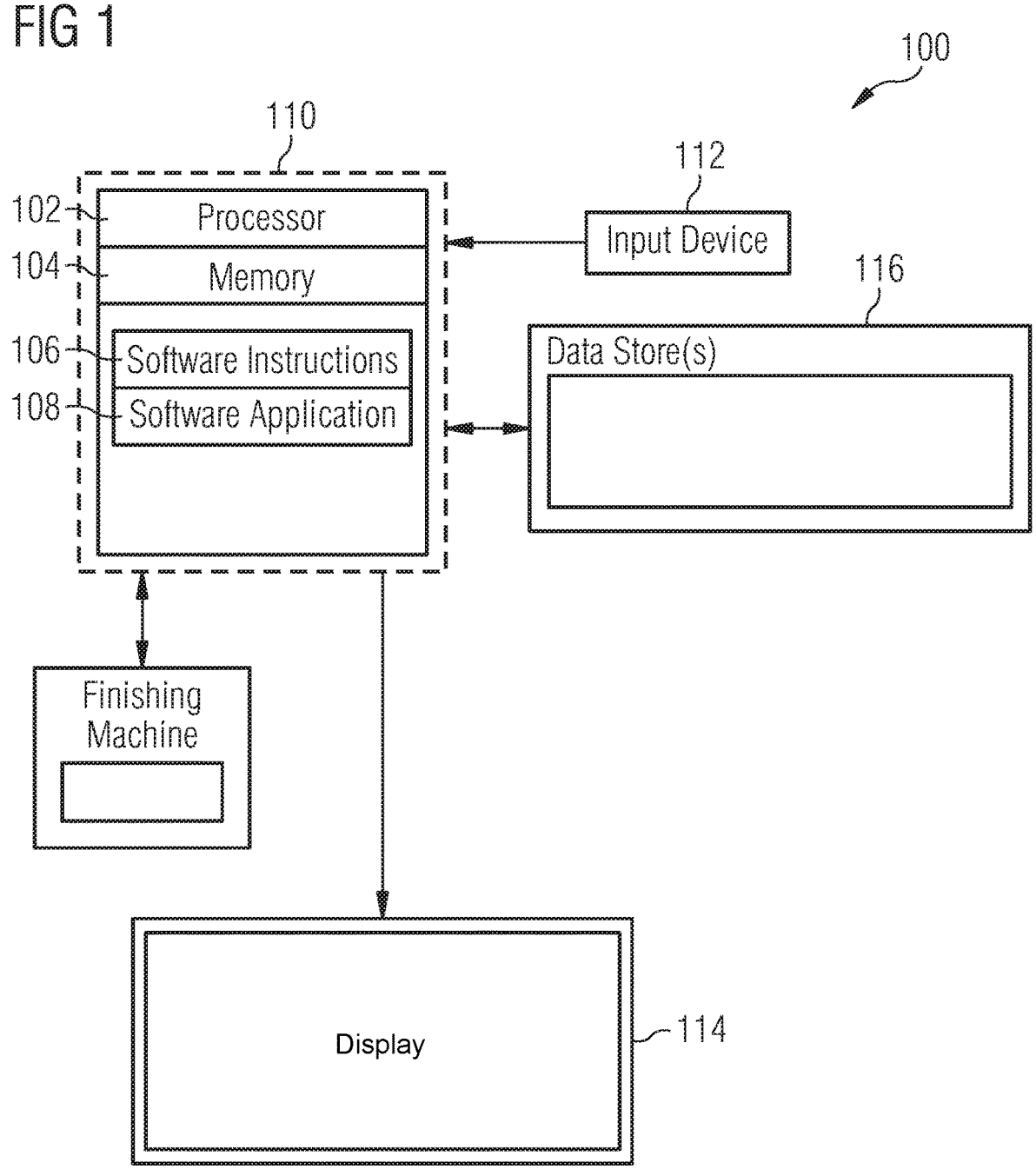
FIG. 1 is an illustration of a functional block diagram of an example system that facilitates workload balancing of a multi-variant serial production line.

Various technologies that pertain to methods and systems that facilitate line balancing will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Referring now to the figures of the drawings in detail and first, particularly to FIG. 1 thereof, there is shown an example data processing system 100 that facilitates carrying out one or more of the embodiments described herein. The system 100 may include a combination 110 of at least one processor 102 (e.g., a microprocessor/CPU) that is configured to carry out various processes and functions described herein by executing from a memory 104, executable instructions 106 (such as software instructions) corresponding to one or more software applications 108 or portions thereof that are programmed to cause the at least one processor to carry out the various processes and functions described herein.

Such a memory 104 may correspond to an internal or external volatile memory (e.g., main memory, CPU cache, and/or RAM), that is included in the processor and/or in operative connection with the processor. Such a memory 104 may also correspond to a nonvolatile memory (e.g., flash memory, SSD, hard drive, or other storage device or non-transitory computer readable media) in operative connection with the processor.

The described data processing system 100 may include at least one input device 112 and at least one display device 114 in operative connection with the processor. The input device, for example, may include a mouse, keyboard, touch screen, or other type of input device capable of providing user inputs to the processor. The display device, for example, may include an LCD or AMOLED display screen, monitor, or any other type of display device capable of displaying outputs from the processor. For example, the processor 102, memory 104, software instructions 106, input device 112, and display device 114, may be included as part of a data processing system corresponding to a PC, workstation, server, notebook computer, tablet, mobile phone, or any other type of computing system, or any combination thereof.

The data processing system 100 may also include one or more data stores 116. The processor 102 may be configured to manage, retrieve, generate, use, revise, and store data and/or other information described herein from/in the data store 116. Examples of a data store may include a database (e.g., Oracle, Microsoft SQL Server), file system, hard drive, SSD, memory card and/or any other type of device or system that stores non-volatile data.

In example embodiments, the software application 108 may include one or more PLM software applications that may be adapted to carry out one or more of the processes and functions described herein. PLM software may include computer-aided design (CAD), computer-aided manufacturing (CAM), and computer-aided engineering (CAE) software.

Examples of such PLM software applications may include the Teamcenter software, Tecnomatix Process Planner, Easy Plan produced by Siemens Product Lifecycle Management Software Inc., of Plano, Tex., US. However, it should be appreciated that the processes and functions described herein may be carried out using other product systems that manage, retrieve, generate, use, revise, and/or store product data.

Figure 2:
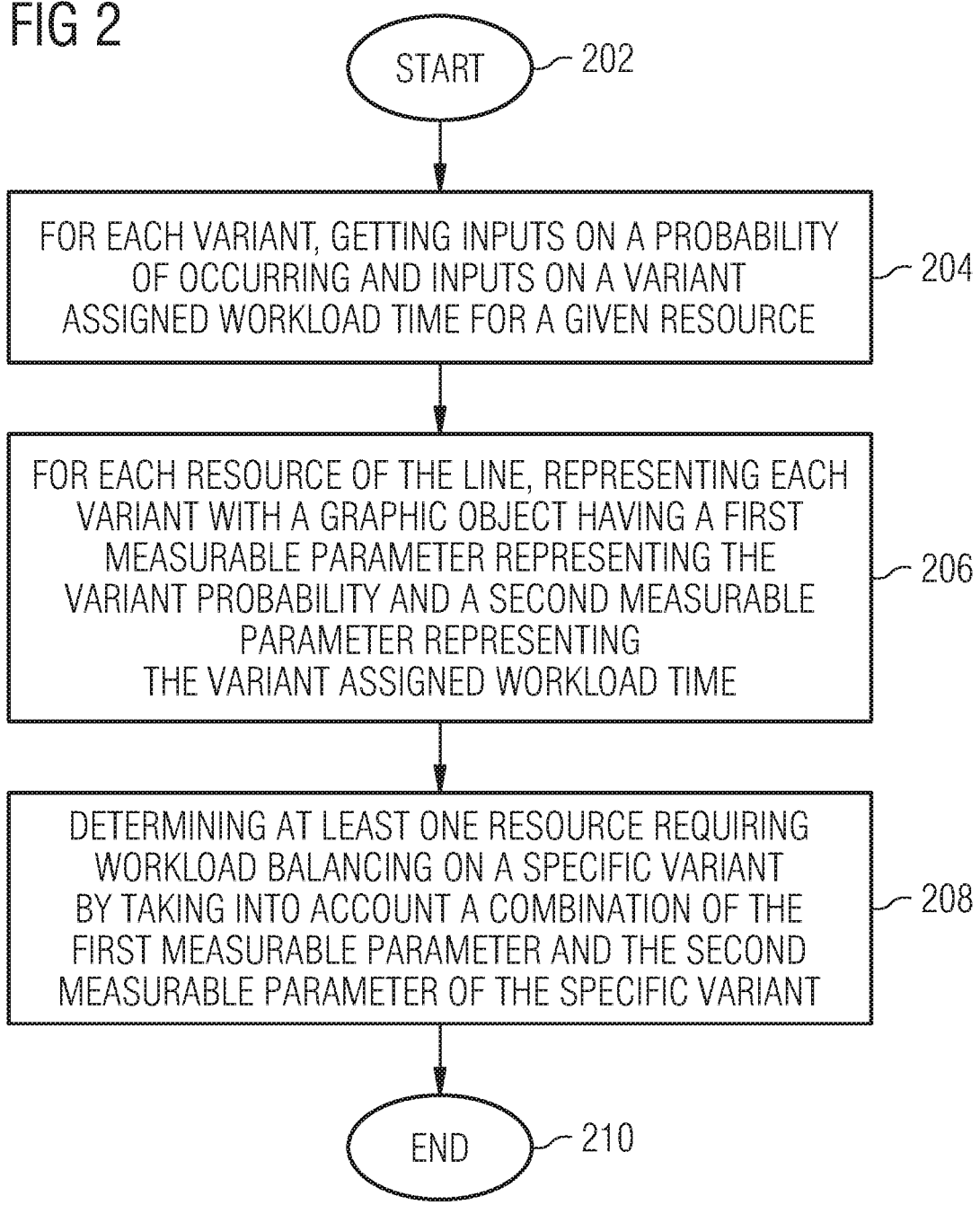
FIG. 2 is a flow diagram of an example methodology of workload balancing of a multi-variant serial production line in accordance with disclosed embodiments.

Referring now to FIG. 2, a methodology 200 is illustrated that facilitates resource workload balancing. While the methodology is described as being a series of acts that are performed in a sequence, it is to be understood that the methodology may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

The methodology may start at step 202 and may include several acts carried out through operation of at least one processor. These steps may include step 204 of getting, for each variant, inputs on a variant probability and inputs on a variant assigned workload time for a given resource.

In addition, the methodology may include step 206 which includes, for each resource of the line, representing each variant with a graphic object having a first measurable parameter representing the variant probability and a second measurable parameter representing the available workload time of the resource.

Furthermore, the methodology may include step 208 which includes determining at least one resource requiring workload balancing on a specific variant by taking into account a combination of the first measurable parameter and the second measurable parameter of the specific variant.

In embodiments, the plurality of graphic objects representing the plurality of variants may preferably be displayed in a 2D screen of a GUI. The 2D screen is conveniently assisting the engineer in line balancing in a guided human-machine interaction process.

In embodiments, the first measurable parameter may advantageously be the size of the graphic object and the second measurable parameter may be the variant assigned workload time position e.g. on the x-axis and/or the directed distance of one or more points of the graphic object from a line representing the takt-time. Advantageously, such measurable parameters are easy to be visualized on a 2D screen as visual dimensions so that the line engineer is assisted in identifying workload critical spots for line balancing purposes. In embodiments, such visual dimensions are of immediate impact and easy to identify for spotting critical balancing issues. In embodiments, these two measurable parameters (e.g. as size and position) are used in parallel, to reflect two attributes (probability and workload).

In embodiments, upon selecting the specific variant of the determined resource, a selection of balancing actions may conveniently be provided. The selections of balancing actions may include, but not be limited to, moving one or more operations from/to the determined resource to/from a candidate resources of a candidate pool.

In embodiments, the workload of the line may conveniently be balanced by performing one or more of the provided selection of balancing actions.

In embodiments, any of the following actions which might have an impact on the graphic objects parameters may be reflected on the 2D screen by automatically updating the graphic objects and their related parameters:
adding/removing one or more operations to/from the production line;
adding/removing one or more resources to/from the production line; and
modifying the variant mix of the production line.

In embodiments, the selection of balancing actions is provided by inputs received from the line engineer or it is provided automatically by the system in accordance with previously gathered or predetermined relevant production data or any combination of human and machine received inputs. Such relevant production data may also be generated through Machine Learning techniques.

In embodiments, the balancing of the workload of the line may be performed upon receiving inputs by a user or upon receiving automatic system inputs or any combination of human and machine inputs.

Also, it should be appreciated that this described methodology may include additional acts and/or alternative acts corresponding to the features described previously with respect to the data processing system 100.

As discussed previously, acts associated with the above-described methodologies (other than any described manual acts) may be carried out by one or more processors 102. Such processor(s) may be included in one or more data processing systems 100, for example, that execute from at least one memory 104 executable instructions 106 (such as software instructions) that are operative to cause these acts to be carried out by the one or more processors.

Also, as used herein a processor corresponds to any electronic device that is configured via hardware circuits, software, and/or firmware to process data. For example, processors described herein may correspond to one or more (or a combination) of a microprocessor, CPU, or any other integrated circuit (IC) or other type of circuit that is capable of processing data in a data processing system. It should be understood that a processor that is described or claimed as being configured to carry out a particular described/claimed process or function may: correspond to a CPU that executes computer/processor executable instructions stored in a memory in the form of software and/or firmware to carry out such a described/claimed process or function; and/or may correspond to an IC that is hard wired with processing circuitry (e.g., an FPGA or ASIC IC) to carry out such a described/claimed process or function.

It should also be understood that a processor that is described or claimed as being configured to carry out a particular described/claimed process or function may correspond to the combination 110 of the processor 102 with the software instructions 106 loaded/installed into the described memory 104 (volatile and/or non-volatile), which are currently being executed and/or are available to be executed by the processor to cause the processor to carry out the described/claimed process or function. Thus, a processor that is powered off or is executing other software, but has the described software instructions installed on a storage device in operative connection therewith (such as a hard drive or SSD) in a manner that is setup to be executed by the processor (when started by a user, hardware and/or other software), may also correspond to the described/claimed processor that is configured to carry out the particular processes and functions described/claimed herein.

Further the phrase "at least one" before an element (e.g., a processor) that is configured to carry out more than one function/process may correspond to one or more elements (e.g., processors) that each carry out the functions/processes and may also correspond to two or more of the elements (e.g., processors) that respectively carry out different ones of the one or more different functions/processes.

It is important to note that while the disclosure includes a description in the context of a fully functional system and/or a series of acts, those skilled in the art will appreciate that at least portions of the mechanism of the present disclosure and/or described acts are capable of being distributed in the form of computer/processor executable instructions (e.g., the described software instructions and/or corresponding firmware instructions) contained within a non-transitory machine-usable, computer-usable, or computer-readable medium in any of a variety of forms, and that the present disclosure applies equally regardless of the particular type of instruction or data bearing medium or storage medium utilized to actually carry out the distribution. Examples of non-transitory machine usable/readable or computer usable/readable mediums include: ROMs, EPROMs, magnetic tape, hard disk drives, SSDs, flash memory, CD, DVDs, and Blu-ray disks. The computer/processor executable instructions may include a routine, a sub-routine, programs, applications, modules, libraries, and/or the like. Further, it should be appreciated that computer/processor executable instructions may correspond to and/or may be generated from source code, byte code, runtime code, machine code, assembly language, Java, JavaScript, Python, C, C#, C++ or any other form of code that can be programmed/configured to cause at least one processor to carry out the acts and features described herein. Still further, results of the described/claimed processes or functions may be stored in a computer-readable medium, displayed on a display device, and/or the like.

Figure 3:
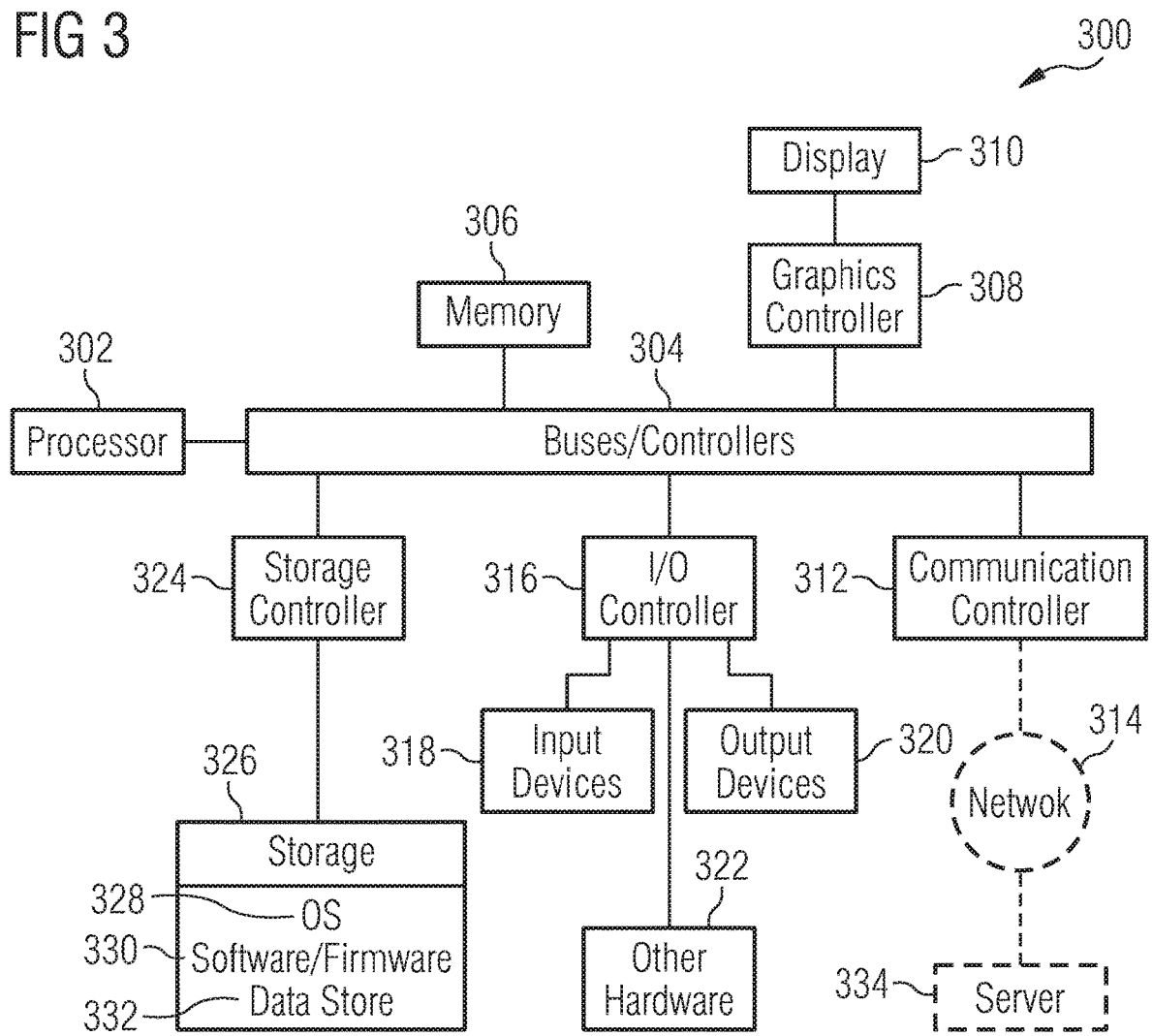
FIG. 3 is a block diagram of a data processing system in which an embodiment may be implemented.

FIG. 3 illustrates a block diagram of a data processing system 300 (e.g., a computer system) in which an embodiment can be implemented, such as the previously described system 100, and/or other system operatively configured by computer/processor executable instructions, circuits, or otherwise to perform the functions and processes as described herein. The data processing system depicted includes at least one processor 302 (e.g., a CPU) that may be connected to one or more bridges/controllers/buses 304 (e.g., a north bridge, a south bridge).

One of the buses 304, for example, may include one or more I/O buses such as a PCI Express bus. Also connected to various buses in the depicted example may include a main memory 506 (RAM) and a graphics controller 308. The graphics controller 308 may be connected to one or more display devices 510 (e.g., LCD or AMOLED display screen, monitor, VR headset, and/or projector). It should also be noted that the processor 302 may include a CPU cache memory.

Further, in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 312 (Ethernet controllers, WiFi controllers, cellular controllers) operative to connect to a local area network (LAN), Wide Area Network (WAN), a cellular network, and/or other wired or wireless networks 314 or communication equipment.

Further components connected to various busses may include one or more I/O controllers 316 such as USB controllers, Bluetooth controllers, and/or dedicated audio controllers (connected to speakers and/or microphones). It should also be appreciated that various peripherals may be connected to the I/O controller(s) (via various ports and connections) including input devices 318 (e.g., keyboard, mouse, pointer, touch screen, touch pad, drawing tablet, trackball, buttons, keypad, game controller, gamepad, camera, microphone, scanners, motion sensing devices that capture motion gestures), output devices 320 (e.g., printers, speakers) or any other type of device that is operative to provide inputs to or receive outputs from the data processing system.

Also, it should be appreciated that many devices referred to as input devices or output devices may both provide inputs and receive outputs of communications with the data processing system. For example, the processor 302 may be integrated into a housing (such as a tablet) that includes a touch screen that serves as both an input and display device. Further, it should be appreciated that some input devices (such as a laptop) may include a plurality of different types of input devices (e.g., touch screen, touch pad, and keyboard). Also, it should be appreciated that other peripheral hardware 322 connected to the I/O controllers 516 may include any type of device, machine, or component that is configured to communicate with a data processing system.

Additional components connected to various busses may include one or more storage controllers 324 (e.g., SATA). A storage controller may be connected to a storage device 326 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 304 such as a PCI Express bus.

A data processing system in accordance with an embodiment of the present disclosure may include an operating system 328, software/firmware 330, and data stores 332 (that may be stored on a storage device 326 and/or the memory 306). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, which is retrievable by a processor.

The communication controllers 312 may be connected to the network 314 (which may or may not be a part of a data processing system 300), which can be any local, wide area, remote, private, and/or public data processing system network or combination of networks, as known to those of skill in the art, including the Internet. Data processing system 300 can communicate over the network 314 with one or more other data processing systems such as a server 334 (which may in combination correspond to a larger data processing system). For example, a larger data processing system may correspond to a plurality of smaller data processing systems implemented as part of a distributed system in which processors associated with several smaller data processing systems may be in communication by way of one or more network connections and may collectively perform tasks described as being performed by a single larger data processing system. Thus, it is to be understood that when referring to a data processing system, such a system may be implemented across several data processing systems organized in a distributed system in communication with each other via a network.

It should also be understood that the term "controller" means any device, system or part thereof that controls at least one operation, whether such a device is implemented in hardware, firmware, software or any combination thereof. It should be noted that the functionality associated with any particular controller may be centralized or distributed, whether locally or remotely. The described processor and memory may be included in a controller. Further, a controller may correspond to the described data processing system or any other hardware circuit that is operative to control at least one operation.

In addition, it should be appreciated that data processing systems may include virtual machines in a virtual machine architecture or cloud environment. For example, the processor 302 and associated components may correspond to the combination of one or more virtual machine processors of a virtual machine operating in one or more physical processors of a physical data processing system. Examples of virtual machine architectures include VMware ESCi, Microsoft Hyper-V, Xen, and KVM.

Also, it should be noted that the processor described herein may correspond to a remote processor located in a data processing system such as a server that is remote from the display and input devices described herein. In such an example, the described display device and input device may be included in a client data processing system (which may have its own processor) that communicates with the server (which includes the remote processor) through a wired or wireless network (which may include the Internet). In some embodiments, such a client data processing system, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In another example, such a client data processing system may execute a web browser or thin client application. Inputs from the user may be transmitted from the web browser or thin client application to be evaluated on the server, rendered by the server, and an image (or series of images) sent back to the client data processing system to be displayed by the web browser or thin client application. Also in some examples, the remote processor described herein may correspond to a combination of a virtual processor of a virtual machine executing in a physical processor of the server.

Those of ordinary skill in the art will appreciate that the hardware depicted for the data processing system may vary for particular implementations. For example, the data processing system 300 in this example may correspond to a controller, computer, workstation, server, PC, notebook computer, tablet, mobile phone, and/or any other type of apparatus/system that is operative to process data and carry out functionality and features described herein associated with the operation of a data processing system, computer, processor, software components, and/or a controller discussed herein. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of the data processing system 300 may conform to any of the various current implementations and practices known in the art.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, it should be understood that the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims.

Moreover, none of these claims are intended to invoke a means plus function claim construction unless the exact words "means for" are followed by a participle.

In an example embodiment, the processor 102 may be configured to get, for each variant, inputs on a probability of occurring and inputs on a variant assigned workload time for a given resource; for each resource of the line, to represent each variant with a graphic object having a first measurable parameter representing the variant probability and a second measurable parameter representing the variant assigned workload time; and to determine at least one resource requiring workload balancing on a specific variant by taking into account a combination of the value of the first measurable parameter and of the value of the second measurable parameter of the specific variant. In embodiments, based thereon at least one step of the production line balancing is caused to be carried out.

In a mixed production line, the probabilities for each specific variant may be given. With the term assigned workload time for a given resource it is intended the time necessary for the given resource to perform the operations of the assigned workload for a specific variant. A workload may include one or more operations and/or activities.

In embodiments, examples of variant graphic objects include, but are not limited to, 2D shapes like circles, bubbles, rounded shapes or other non-rounded shapes, e.g. pie slices, histograms, 1D shapes like lines or dots. An example of round shape includes, but it is not limited to, the bubble shape of the variant graphic objects shown in the charts of FIGS. 4-7. Examples of non-round shapes include, but they are not limited to, the shapes of the variant graphic objects shown in the charts of FIGS. 10 and 11.

An example of a first measurable parameter of the graphic object includes, but is not limited to, the size of the graphic object. For example, in case of circularly shaped object, its size may be measured with its area or its radius/diameter, in case of a pie-slice shaped object, its size may be measured with its angular width, in case of a histogram shaped object or dot shaped object, its size may be measured with its height (y-value or x-value). Another example of a first measurable parameter of the graphic object includes but is not limited to, the color transparency/density level of the graphic object as shown in the example embodiment of FIG. 10B. In other embodiments, the first measurable parameter may be any other measurable parameter whose value is easily displayable and identifiable on a GUI screen.

In embodiments, the available workload time of the resources may preferably be represented with a line on a graphic screen, herein denoted as takt-time line. In embodiments, the takt-time line may be a straight line segment (as for examples represented in FIGS. 4-6 and 10) or a circular line or arc (as for examples represented in FIG. 11) in case of slice-pie representation. In other embodiments, the takt-time line may have other shapes.

In embodiments, the second measurable parameter is the directed distance between one or more points of the graphic object and the takt-time line. For example, the directed distance of the bubble centers from the takt-time line segment of the corresponding resources (as shown in the example embodiments of FIGS. 4 to 7).

In embodiments, in order to determine a resource requiring workload balancing on a specific variant, the directed distance provides an indication of over or under-utilization of a resource depending on the "direction" of the directed distance.

In embodiments, the assigned workload time of a variant may preferably be as close as possible to the takt-time line for a variety of production-related reasons. Examples of production related reasons include, but are not limited to, ensuring that the resource has enough time to perform its work in a cycle, avoiding resource-idle states, reduce bottlenecks, increase production efficiency. Therefore the smaller the absolute value of the directed distance, the closer to the ideal situation of a perfectly balanced line as shown in the example embodiment of FIG. 5. The "direction" of the directed distance indicates whether the deviation is due to under or over utilization of the resource. Such indication is advantageously helpful for prioritizing the resource/variant requiring balancing actions and it is also helpful for identifying possible candidates for operation moving.

With embodiments, the graphic objects displayed in the 2D screen assist the product line engineer in the task of workload balancing of a multi-variant serial production line.

Embodiments enable to display for each resource a graphic object representing two variant specific production parameters on a single axis: resource work load for each variant with respect to the takt-time line and probability of each variant.

With embodiments, in a 2D view it is displayed—for each of the plurality of resources—an overview of all the variants with a graphic representation of the corresponding probabilities and of their deviation from the takt-time line.

In embodiments, by using a single axis for representing variant probabilities and variant workloads, the plurality of resources can be advantageously laid one below the other. Conveniently, much line balancing status information is condensed in a 2D diagram.

The line engineer is assisted in line balancing by being able to visualize an updated status of the two parameters variant workload and variant probability. In addition, the compact layout enables to scan numerous resources in relatively little screen space.

Conveniently, the most critical issues are easily spotted by the line engineer who is therefore interactively assisted in the workload balancing task.

In embodiments, for each resource, the probability of each variant and the variant deviation from the takt-time line is identifiable in a straightforward manner.

In embodiments, the product line manager is assisted in workload line balancing with a screen representing information of variant workloads per line-resources and variant probabilities.

With embodiments, the engineer is interactively assisted by the machine with prioritizing criteria for identifying and handling the most critical issues for line balancing purposes.

With embodiments, the line engineer is facilitated in analyzing and understanding the balancing state of the line, while considering all variants and their probabilities.

With embodiments, in complex serial production lines, the balance of the workload among resources across the line is facilitated. This is for example useful to prevent bottlenecks and expensive under-utilizations of resources. With embodiments, the line engineer is assisted in identifying and correcting workload balancing critical issues within the line.

With embodiments, the line engineer is facilitated in spotting the issues to be handled and/or in getting and/or in providing balancing actions for improving the line balancing.

Embodiments enable the production line engineer to balance a line in a proactive, timely, efficient and/or precise manner.

Embodiments facilitate automated line balancing.

With embodiments, the line engineer is enabled to monitor the line workload balancing status as activities to resources are assigned and/or as the production variant mixture is modified.

Figure 4:
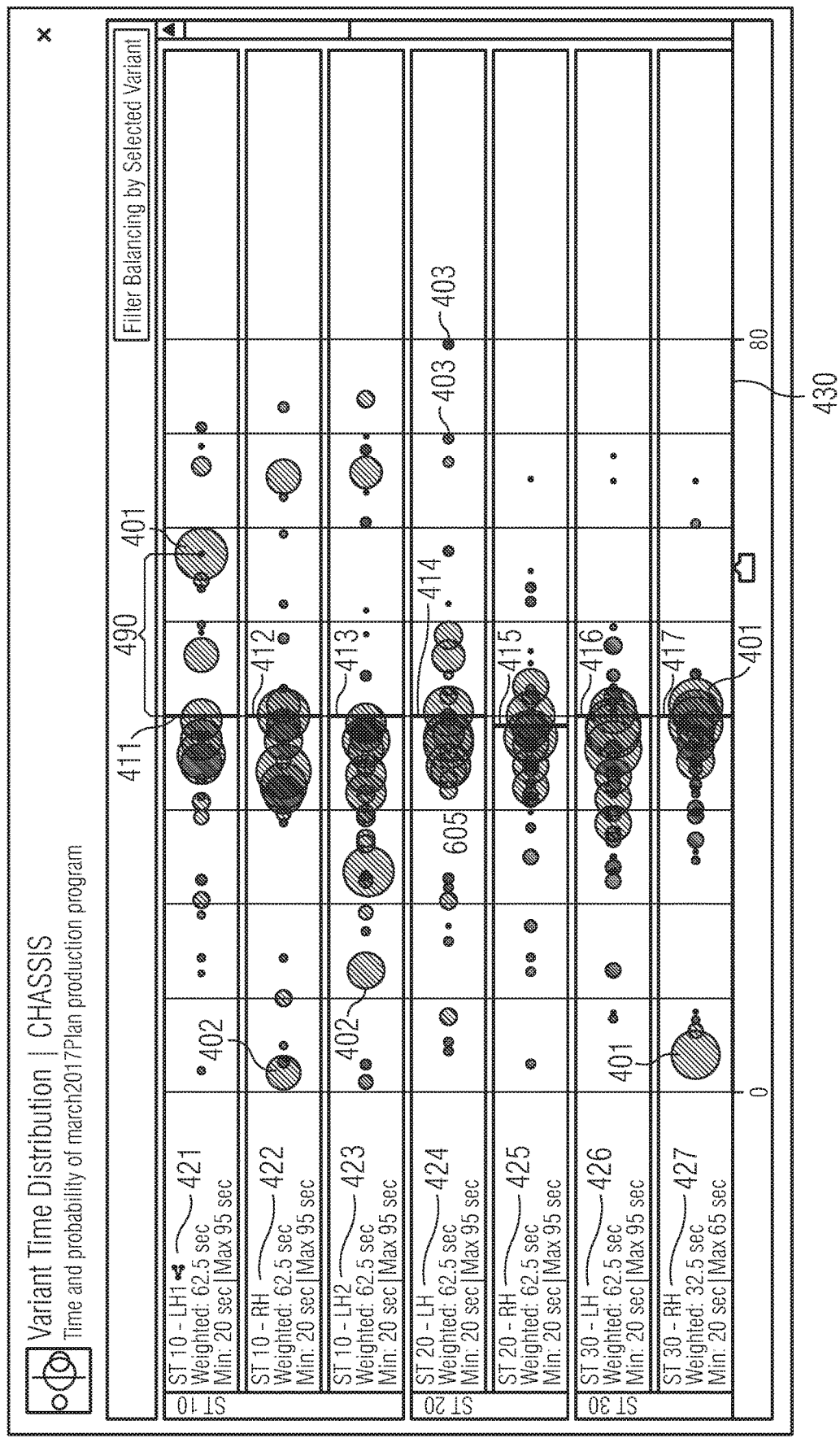
FIG. 4 is an illustration of an example of a GUI screenshot chart of an unbalanced line in accordance with disclosed embodiments.

FIG. 4 illustrates an example of a GUI screenshot chart of an unbalanced line in accordance with disclosed embodiments.

The exemplary GUI chart is intended to relate to a variant distribution of an exemplary serial production line of a chassis with a plurality of variants and seven stations 421, . . . , 427. In the chart, the resources of the serial production line are shown as a discrete dimension, in this example the resources are the seven stations 421, 427 and are laid out one below the other.

In other embodiments, vertical and horizontal axes can be flipped, for example by using the vertical axis for the continuous dimension and the horizontal one for the discrete dimension.

The chassis variants are represented with graphic objects 401, 402, 403 with a bubble-like shape. For each resource, each given bubble represents a corresponding given variant. The probability of a given variant is represented with the size of the corresponding bubble. The larger the size of a given bubble the higher the probability for the corresponding given variant to occur in the line.

In this exemplary embodiment, the horizontal axis 430 is a time axis with seconds as a time-unit measure.

For each given resource 421, . . . , 427, the given takt-time is indicated with a corresponding given takt-time segment or line 411, . . . , 417.

For each resource, the directed distance 490 between the center of a specific bubble 403 and the resource takt-time line 411 represents the difference between the assigned workload time of the corresponding specific variant and the takt-time of the resource.

In summary, with embodiments, for a given resource, two parameters are displayed on a single axis for a plurality of variants, the variant workload-time and the variant probability. The horizontal axis may advantageously use to both the workload time of the variant and the takt-time of the resource. Along the same axis, a plurality of bubbles 401, 402, 403 may be conveniently displayed, each representing a single different variant.

For each resource, the position of the bubble center along the horizontal axis indicates the currently assigned workload of the corresponding variant, while the radius/size of the bubble indicates the probability of the variant in the production mix.

Advantageously, for the same given resource, several variants can be displayed along the x-axis, even when overlapping and may be distinguishable, when necessary, by means of a selection.

Advantageously, in embodiments, on one single axis of the chart, e.g. the horizontal axis, two visual dimensions are represented: the cycle-time by the position of the bubble along the axis and the variant probability by the bubble diameter/size, while the resources are represented with a third, discrete dimension. This chart representation is conveniently compact and facilitates the line engineer in her/his task of line workload balancing.

The takt-time is indicated on the axis as a segment, and the distance of each circle from this indication reflects the fulfillment of the takt-time constraint. Advantageously, the production line may be scanned by an engineer or automatically in order to spot the most critical issues for line balancing purposes.

In embodiments, the layout is advantageously compact, since variants and resources do not scale in the same direction. Conveniently, adding variants does not elongate the layout and will not increase the need of scrolling. With embodiments, several variants are shown on the same chart also in an overlapping manner thus conveniently enabling a compact representation.

With embodiments, the line engineer is enabled to monitor the line workload balancing status as activities to resources are assigned. In fact not all activities that are assigned to a resource may have an impact and be relevant for every variant. With embodiments, the differences in workloads for each variant are taken into account.

Figure 5:
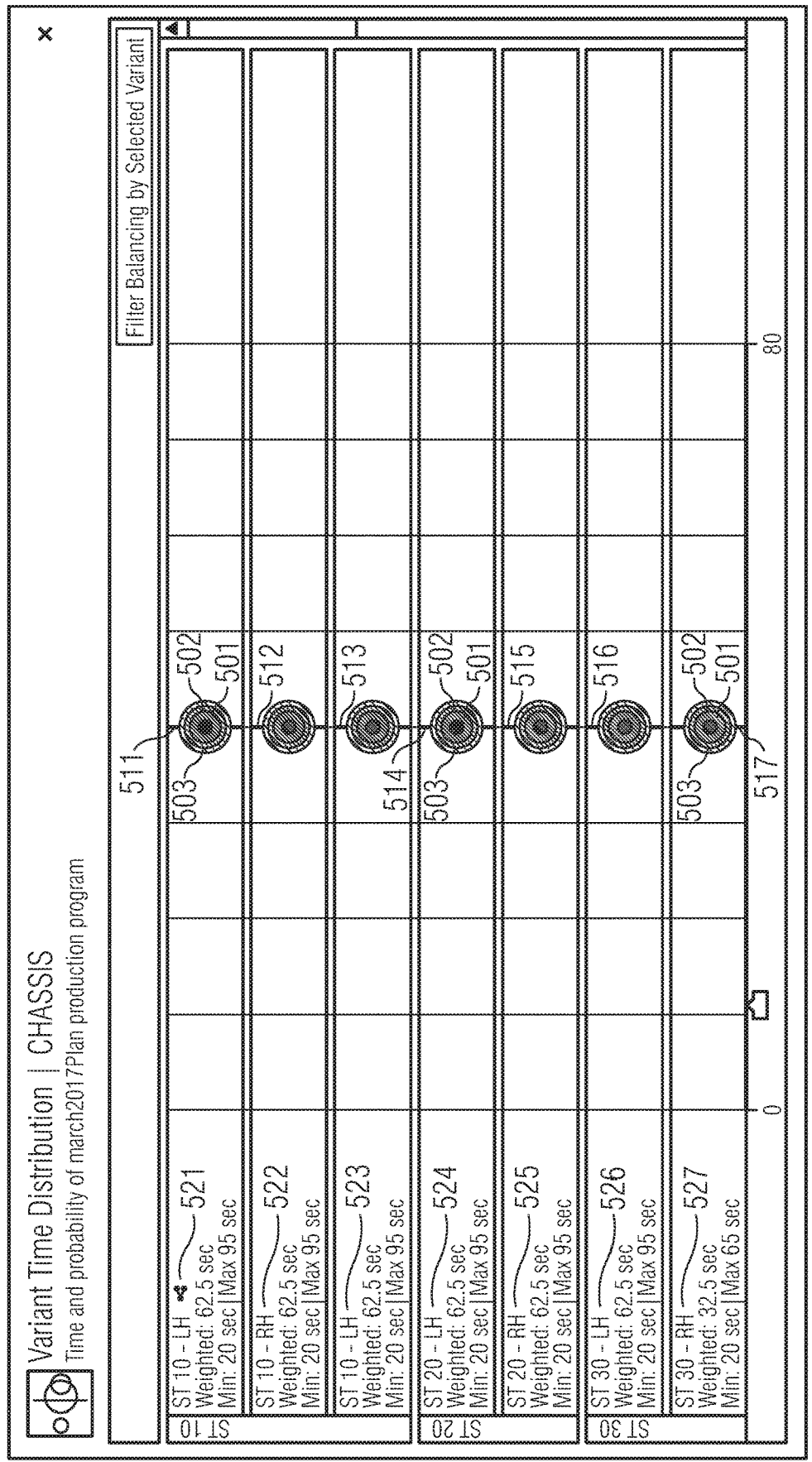
FIG. 5 is an illustration of an example of a GUI screenshot chart of a perfectly balanced line in accordance with disclosed embodiments.

FIG. 5 illustrates an example of a GUI screenshot chart of a perfectly balanced line in accordance with disclosed embodiments. The chart of FIG. 5 shows an ideal scenario for illustration purposes. All the variant bubbles 501, 502, 503 have zero directed distance from the takt-time line 511, . . . , 517 of the corresponding resource.

It is noted that in this chart, differently than the previous chart of FIG. 4, it is a particular case of embodiment where the takt-time lines 511, . . . , 517 are aligned with each other. The takt-time segment alignment indicates that all seven resources 621, 627 have the same available workload time.

Figure 6:
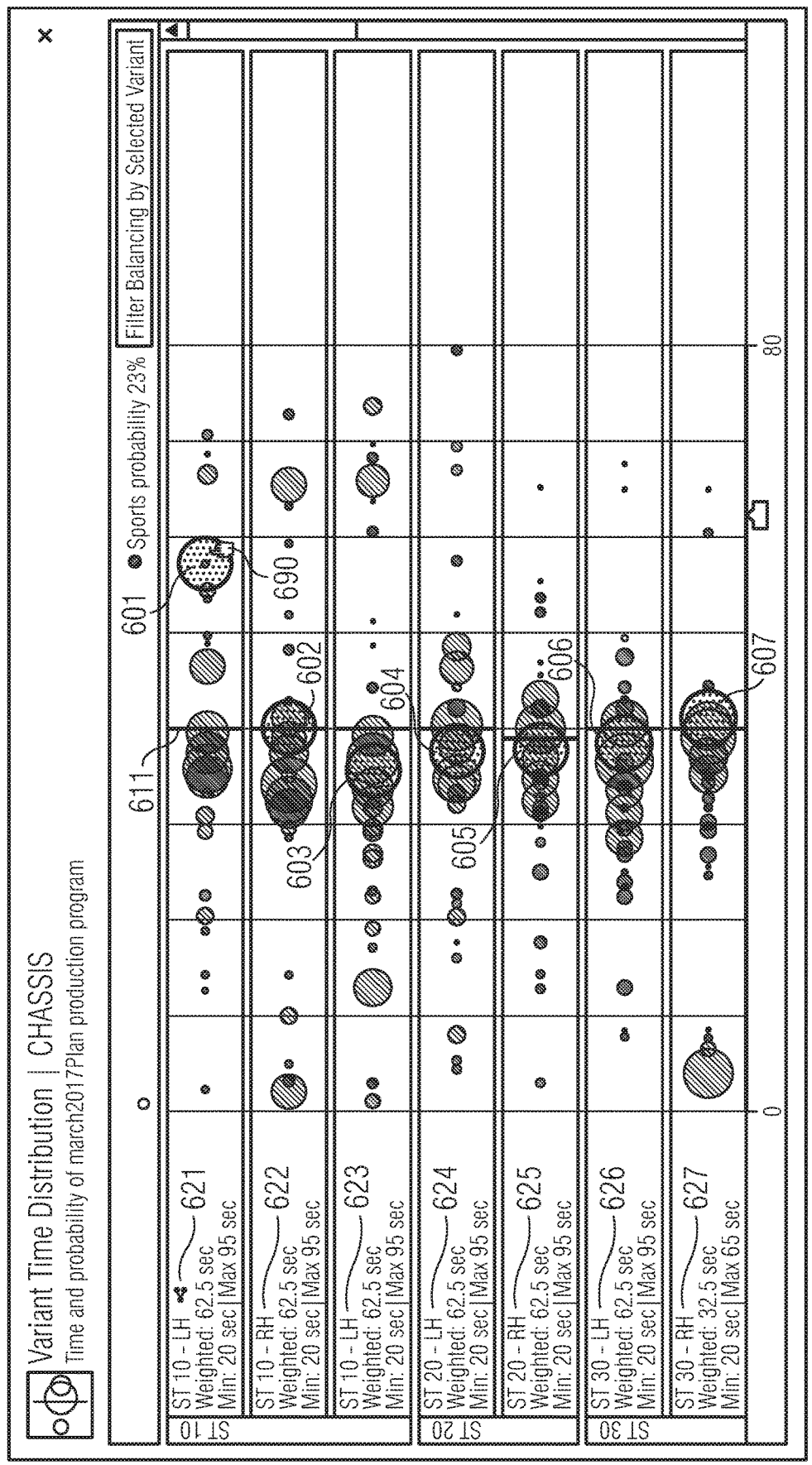
FIG. 6 is an illustration of an example of a GUI screenshot chart of a variant selection in accordance with disclosed embodiments.

By comparing FIGS. 4-6, the skilled person understands that the goal of the line balancing actions is to cause the bubbles, especially the larger ones, to move towards their corresponding takt-time line, for example, when possible, by operations moving from a bubble on the right (overloaded resource) to a bubble on the left (under-utilized resource).

This balancing interventions aimed at bubble pushing and operations moving remind the steering actions through a control switch or joystick in form of bubbles where the control actions aim is to move the larger distant bubbles towards their takt-time line.

FIG. 6 illustrates an example of a GUI screenshot chart of a critical variant selection in accordance with disclosed embodiments.

In the chart of FIG. 6 corresponding to the chart of FIG. 4, it is selected one variant appearing to have the most critical issues. For example, a critical issue can be spotted in the first station 621 on the variant bubble 601, which is large in size and at a large distance from the corresponding takt-time line 611, indicating over-utilization of the first station for a variant having a large probability of occurring.

One can select the critical variant by clicking on the bubble 621 with the mouse pointer 690.

Conveniently, all the remaining six bubbles 602, . . . , 607 representing the same variant for the other six stations 622, . . . , 627 may then be highlighted for example with the same recognizable color, shading-level or other highlighting methods. The seven bubbles 601, . . . , 607 of the selected variant of FIG. 6 are highlighted with a dotted texture and a bold line.

In such a manner, the line engineer is facilitated to spot which are the under-utilized stations as possible candidates for operations moving.

For example, station 603 is an under-utilized station for this selected variant.

In other embodiments, alternative selection and highlighting techniques for the variant may be implemented.

In other embodiments, the critical variants are automatically selected and highlighted on the screen.

With embodiments, as the product engineer fixes the critical issues and improves the balancing state, and as new variants are added to the line, the chart keeps reflecting the current state.

With embodiments, the production or industrial engineer is assisted in solving an engineering problem, also at runtime. In fact, the chart may show the up-to-date balancing state.

In embodiments, the two measurable parameters of the graphic object may preferably be represented on a user interface or human-machine interface, also with Virtual Reality and/or Augmented Reality techniques easing the interaction of the line engineer with the machine in his/her task of balancing the multi-variant serial production line.

Figure 7:
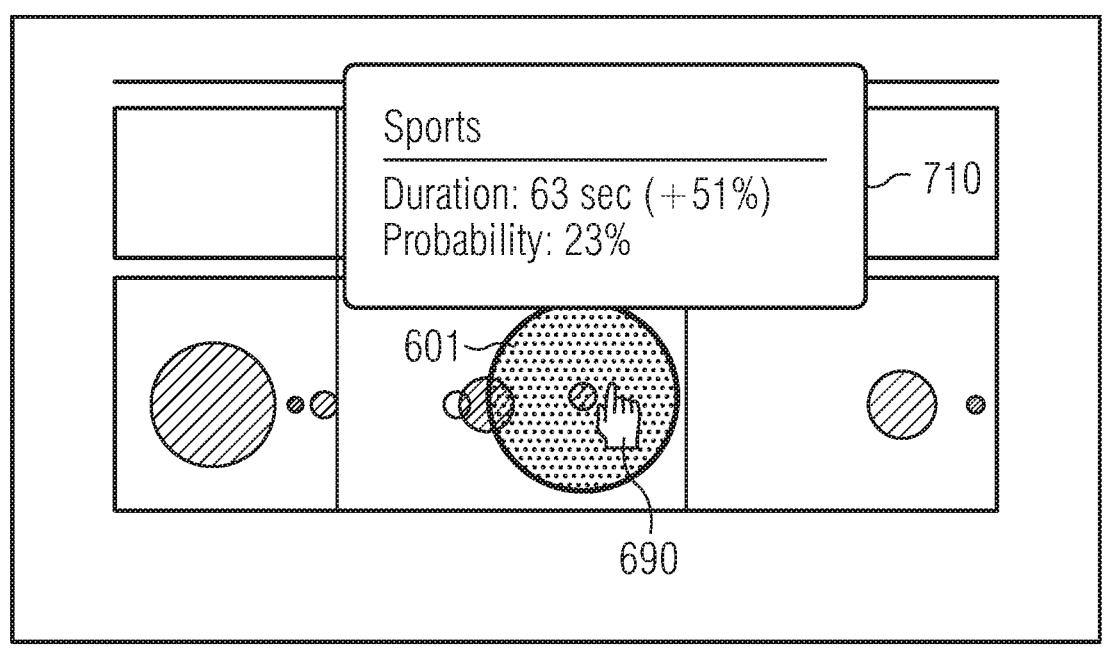
FIG. 7 is an illustration of an example of a first pop-up window for a selected variant of a given resource in accordance with disclosed embodiments.

FIG. 7 illustrates an example of a first pop-up window 710 providing more information for a selected variant of a given resource in accordance with disclosed embodiments.

The selected critical "Sports" variant has a probability of occurring of 23%. This variant has an assigned workload time on the first station of 63 seconds which is 53% more than the takt-time of this station.

The information of the first pop-up window 710 may be obtained by hovering with the mouse on the bubble 601. In other embodiments, the same information of the first pop-up window 701 may alternatively or additionally be displayed for each station for the selected variant, for example on the right side of the chart, without the need of an ad hoc hovering 690.

FIG. 8A illustrates an example of a second pop-up window for the selected "Sport" variant of the first resource 621 where all the operations and activities 801 contributing to the assigned workload of this "Sport" variant at the first station 621 are listed.

FIG. 8B illustrates a selection 810 of operations and activities which represent possible candidates for being moved to another candidate station so as to reduce to the workload of the variant and pushing it towards its takt-time segment 621. The operation selection 810 may be performed by the engineer or, in embodiments, automatically by the system according to some predetermined criteria.

Figure 9:
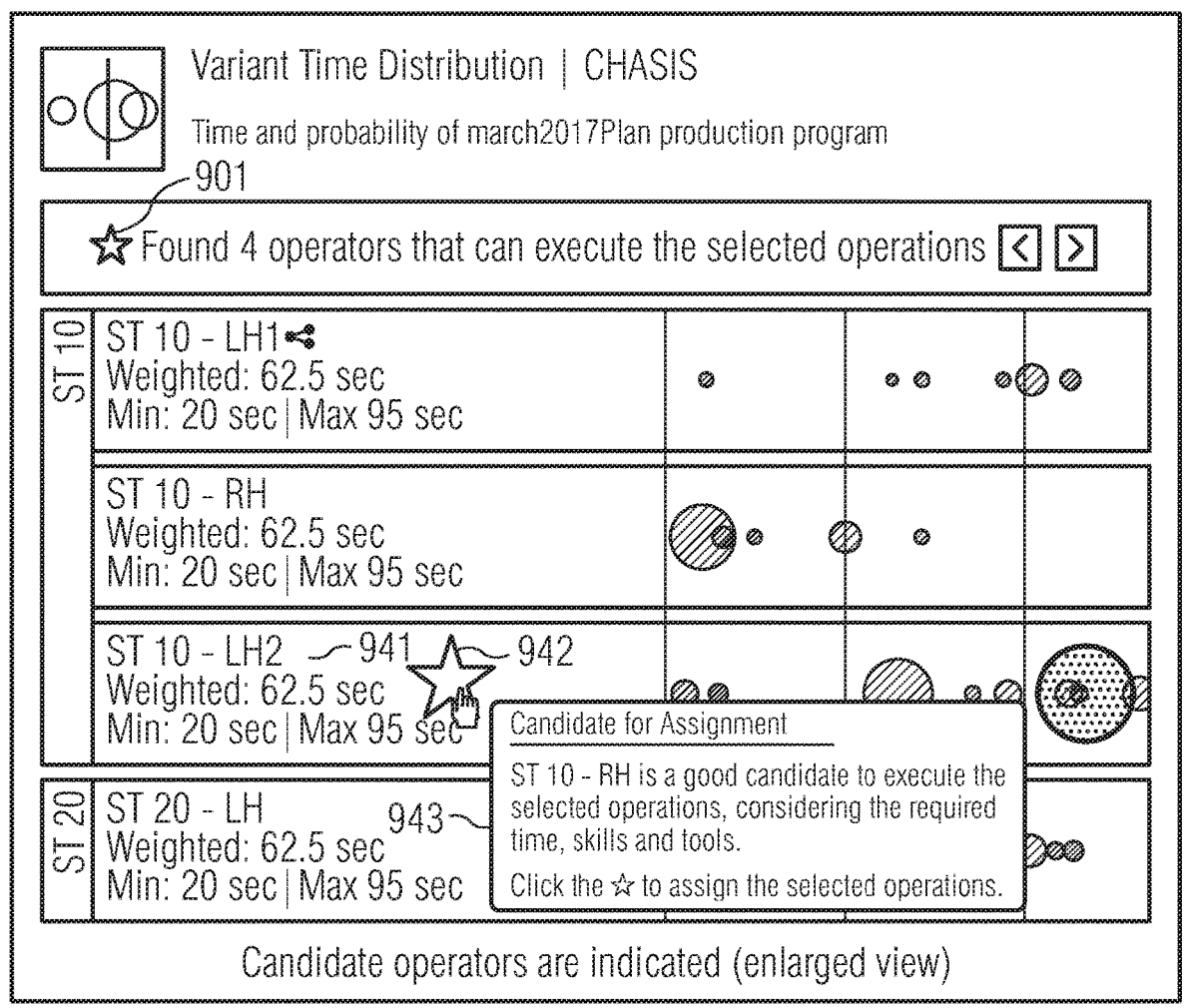
FIG. 9 is an illustration of an example of an indication of candidate resources in accordance with disclosed embodiments.

FIG. 9 illustrates an example of an indication of candidate resources in accordance with disclosed embodiments.

In embodiments, once the operation selection 810 has been performed, possible station candidates 901 for taking over the selected operations 810 are provided.

In the example of FIG. 4 four candidate stations 901 have been found and one of them being the under-utilized station 941 indicated with a star 942. By hovering over it, suggestions to the engineer appear in a pop-up window 943 containing for example the following message: "ST 10-RH 641 is a good candidate to execute the selected operations, considering the required time, skills and tools. Click the "star" to assign the selected operations."

In embodiments, the suggestion for candidates may take into account the constraint of the takt time, as well as other parameters and constraints like for example the tools in the station, the operator skills, the dependencies between operations and other criteria. It may also consider other variants of the resource, for which the operations are relevant.

In embodiments, the engineer may select a selection of movable operations/activities of the critical workload and may select, from some automatically provided selection of resource and variant candidates, where operations/activities may preferably be moved.

In embodiments, changes to the line may then be performed so as to balance its workload. In embodiments, the station candidates for operations moving may be provided by the engineer herself/himself or she/he may get assisted in spotting under-utilized resources or he/she may receive a resource candidate pool automatically from the system and approve it.

In embodiments, the suggestions of which operations to which resource to be moved may be automatically provided to the engineer. The engineer may approve the automatically generated selection and immediately visualize its effect on the line balance screen.

In embodiments, once the engineer chooses an operator to move the operations to, he can perform the move, for example by dragging the operations to an operator, or by using an interaction on the indication.

Embodiments enable ongoing assistance in the balancing task process, whereby the product line engineers are guided in their balancing process in a human-machine interactive manner.

In embodiments, as the engineer approves workload balancing changes to the line, the chart gets updated to provide an up-to-date visual reflection of the balancing state.

In embodiments, a layer of visual representations and interactions, provided on top of industry-targeted computations, gathered and/or predetermined knowledge, assists the production engineer in balancing a mixed-production line, providing these advantages: assisting in precisely finding where balancing issues exist on the line and assess their severity according to the provided visual representation; once a problematic variant is identified, showing production information data for it; assisting in finding resources that are fit to execute given operations, while considering time availability and constraints; keeping the chart up-to-date while the balancing status changes, to provide ongoing reliable feedback on the current state. In embodiments, in addition to interacting with the chart and using it to directly handle the issues, the line engineer may also use it to configure the legacy line balancing system. For this, he/she selects a variant (bubble) that he wants to handle, and execute a filter, which filters the line balancing system to show only this variant.

Examples of changes to the production line include, but are not limited to: move operations between resources, change the production mix, add/remove operations to/from the line, add/remove stations and resources.

Therefore, with embodiments, in addition to reflecting the current balancing status, the chart assists the engineer in fixing the problems also in an interactive assisted manner with the system. When he/she selects a variant of one resource in the chart, the same variant is highlighted for all other resources. This assists the engineer in efficiently finding resources to which he can move extra work from an over-utilized resource, and vice versa.

With embodiments, it is provided optimization criteria for prioritizing which resource require to be balanced in a step-like methodology approach.

In embodiments, the combination of the two graphic parameters reflect the priority in which line balancing problems may be preferably treated in order to maximize line efficiency and balance. For example, the at least one resource requiring workload balancing may be a variant with a high probability and a large directed difference from the takt line of the resource. Criteria for spotting the critical issues may include, but not be limited by, the further the circle is from the takt time and the larger it is, the more important it is to handle the variant it represents. With embodiments, the probability of each variant in the production mix is taken into account. In fact, the probability is an important factor in assessing the severity of an un-balanced variant, especially in the case of under-utilization. In fact, it may be acceptable to let the resource be idle when a rare variant passes through its station but it may be preferable to utilize its time well for a variant which is produced often. Thus with embodiment, the engineer is assisted in identifying the critical situations of resource workload in a production line where the product variants have higher probability of recurrence.

With embodiments, selection criteria, prioritizing criteria, and/or proposal of candidates are provided for line balancing purposes. For example, which operation to move between stations, based on probability of the variant, the duration of the activity and overall load in the station for given probabilistic distribution of variants.

Figure 10A:
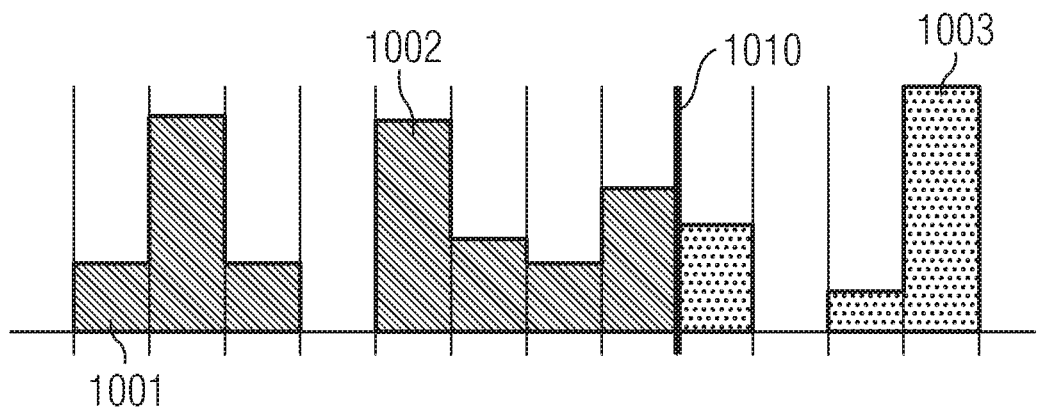
FIGS. 10A, 10B and 10C are three exemplary chart representations of a multi-variant resource of a serial production line in accordance with disclosed embodiments.
Figure 10B:
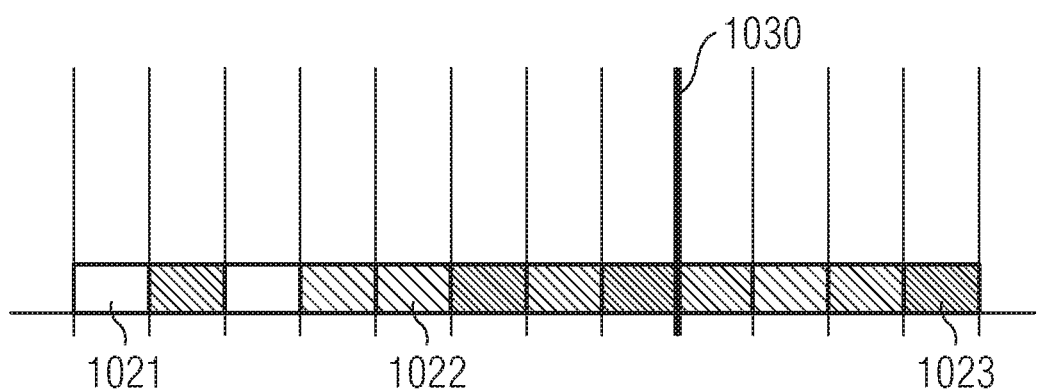
Figure 10C:
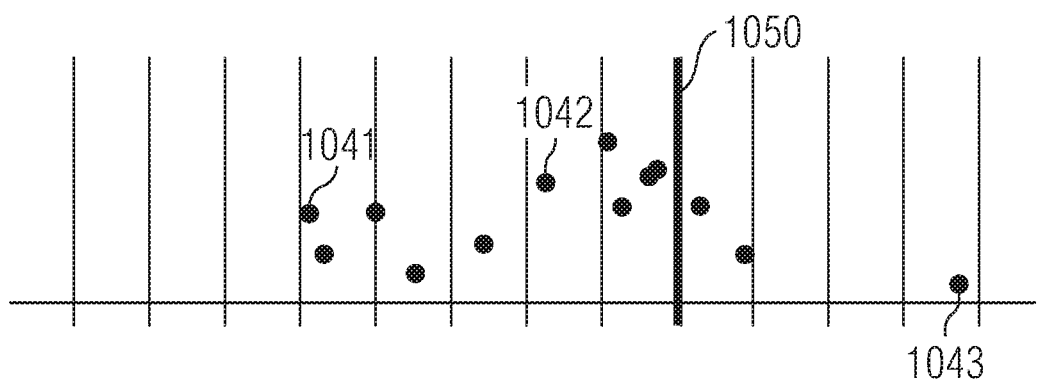

FIGS. 10A, 10B and 10C illustrate another three exemplary chart representations of a multi-variant resource of a serial production line in accordance with disclosed embodiments. FIG. 11 illustrates a fourth exemplary chart representation of multi-variant resources in a serial production line in accordance with disclosed embodiments.

In other embodiments, other graphic objects than bubbles may conveniently be used. Examples of other graphic objects include, but it is not limited to, histograms, dots/circles, cells/bars with different transparency level and other shape types like for example slice pies.

Accordingly, the probability may be then represented by measurable parameters whose values are displayable one a screen and easy to visualize and identify. Examples include, but are not limited to; size, color/transparency, vertical position of such graphic objects.

In FIG. 10A, the exemplary embodiment chart shows variants represented by histograms 1001, 1002, 1003 whose height represents the variant probability and which have given directed distances from the takt-time line 1010. The direction of the directed distance of the histograms is highlighted with a different color, shadings or filling patterns (e.g. dotted vs. dashed filling pattern).

In FIG. 10B, the exemplary embodiment chart shows variants represented by cells 1021, 1022, 1023 whose pattern filling level represents the variant probability (e.g. the thicker the filling, the higher the probability) and which have given directed distances from the takt-time line 1030.

In FIG. 10C, the exemplary embodiment chart shows variants represented by dots 1041, 1042, 1043 whose height represents the variant probability and which have corresponding directed distances from the takt-time line 1050.

FIG. 11 shows another example embodiment with a pie representation where the takt-time line is a circular line 1103. Each resource workload 1101 is represented by a pie, whose sectors are the variants. For a given variant in a pie, the pie portion area outside the circle denotes 1104 over utilization coupled with probability of the given variant and the missing pie portion 1105 to arrive to the takt line denotes under-utilization coupled with the variant probability. In embodiments, over utilization of a resource may be highlighted by using for example a recognizable filling pattern (for example a dotted filling as shown or a different color not shown). The variant probability is represented with the angular width of the circular sector of the pie as percentage of a 360 degree angle.

Although an exemplary embodiment of the present disclosure has been described in detail, those skilled in the art will understand that various changes, substitutions, variations, and improvements disclosed herein may be made without departing from the spirit and scope of the disclosure in its broadest form.

The invention claimed is:

1. A method for workload balancing of a multi-variant serial production line, wherein the multi-variant serial production line having a plurality of resources with a plurality of assigned workloads for a plurality of variants, which comprises the steps of:
    getting, for each of the variants, inputs on a probability of occurring and inputs on a variant assigned workload time for a given resource;
    for each resource of the multi-variant serial production line, representing each of the variants with a graphic object having a first measurable parameter representing a variant probability and a second measurable parameter representing the variant assigned workload time; and
    determining at least one resource requiring workload balancing on a specific variant by taking into account a combination of the first measurable parameter and the second measurable parameter of the specific variant.

2. The method according to claim 1, which further comprises displaying the graphic object on a 2D screen.

3. The method according to claim 1, wherein the first measurable parameter represents a size of the graphic object and the second measurable parameter represents a position of the graphic object and/or a directed distance of at least one point of the graphic object from a line representing available workload time of the resource.

4. The method according to claim 1, wherein upon selecting the specific variant of a determined resource, further including a selection of balancing actions, including moving at least one operation from/to the determined resource to/from a candidate resource of a candidate pool.

5. The method according to claim 4, which further comprises including balancing a workload of the multi-variant serial production line by performing at least one of the balancing actions selected.

6. A data processing system, comprising:
    a processor;
    an accessible memory;
    the data processing system configured to:
        get, for each variant, inputs on a probability of occurring and inputs on a variant assigned workload time for a given resource of a multi-variant serial production line;
        for each resource of the multi-variant serial production line, represent each said variant with a graphic object having a first measurable parameter representing a variant probability and a second measurable parameter representing the variant assigned workload time; and
        determine at least one resource requiring workload balancing on a specific variant by taking into account a combination of the first measurable parameter and the second measurable parameter of the specific variant.

7. The data processing system according to claim 6, wherein the graphic object is displayed on a 2D screen.

8. The data processing system according to claim 6, wherein the first measurable parameter represents a size of the graphic object and the second measurable parameter represents a position of the graphic object and/or a directed distance of at least one point of the graphic object from a line representing an available workload time of a resource.

9. The data processing system according to claim 6, wherein upon selecting the specific variant of a determined resource, further including a selection of balancing actions, including moving at least one operation from/to the determined resource to/from a candidate resource of a candidate pool.

10. The data processing system according to claim 6, wherein the data processing system is further configured to balancing a workload of the multi-variant serial production line by performing at least one of the balancing actions selected.

11. A non-transitory computer-readable medium encoded with executable instructions that, when executed, cause a data processing system to:
    get, for each variant, inputs on a probability of occurring and inputs on a variant assigned workload time for a given resource of a multi-variant serial production line;
    for each resource of the multi-variant serial production line, represent each of said variant with a graphic object having a first measurable parameter representing a variant probability and a second measurable parameter representing the variant assigned workload time; and determine at least one resource requiring workload balancing on a specific variant by taking into account a combination of the first measurable parameter and the second measurable parameter of the specific variant.

12. The non-transitory computer-readable medium according to claim 11, wherein the graphic object is displayed on a 2D screen.

13. The non-transitory computer-readable medium according to claim 11, wherein the first measurable parameter represents a size of the graphic object and the second measurable parameter represents a position of the graphic object and/or a directed distance of at least one point of the graphic object from a line representing an available workload time of a resource.

14. The non-transitory computer-readable medium according to claim 11, wherein upon selecting the specific variant of a determined resource, further including a selection of balancing actions, including at least one operation from/to the determined resource to/from a candidate resource of a candidate pool.

15. The non-transitory computer-readable medium according to claim 11, further causing to balance a workload of the multi-variant serial production line by performing at least one of the balancing actions selected.

* * * * *